Oct. 17, 1933.  M. E. REAGAN  1,930,538
MOTOR STARTING SYSTEM
Filed Nov. 7, 1927  2 Sheets-Sheet 1

INVENTOR
Maurice E. Reagan.
BY
Wesley G. Carr
ATTORNEY

Oct. 17, 1933.    M. E. REAGAN    1,930,538
MOTOR STARTING SYSTEM
Filed Nov. 7, 1927    2 Sheets-Sheet 2

INVENTOR
Maurice E. Reagan.
BY
ATTORNEY

Patented Oct. 17, 1933

1,930,538

UNITED STATES PATENT OFFICE 1,930,538

MOTOR STARTING SYSTEM

Maurice E. Reagan, Swissvale, Pa., assignor to Westinghouse Electric & Manufacturing Company, a corporation of Pennsylvania Application November 7, 1927. Serial No. 231,465

15 Claims. (Cl. 172—289)

This invention pertains to automatic starting systems for motors provided with direct connected exciters, especially synchronous motors, or motor-generator sets. This invention finds its principal field of usefulness in the automatic starting of motors in automatic or semi-automatic substations.

One object of this invention is to provide means for starting a synchronous motor with a limited field current.

Another object of this invention is to limit the voltage generated by the exciter to approximately the same percentage of its normal value as the starting voltage applied to the armature is of the full running voltage.

Another object of my invention is to control the voltage generated by the exciter in accordance with the value of the motor starting current.

A further object of my invention is to control the transfer from starting to running connections by means of a relay responsive to the exciter voltage.

A still further object of this invention is to design a starting system for motors in which the transfer from starting to running connections is accompanied by a minimum disturbance in the supply line.

Further objects of this invention will appear as the description proceeds. The invention may be more fully understood by reference to the accompanying drawings, wherein—

Figure 1:
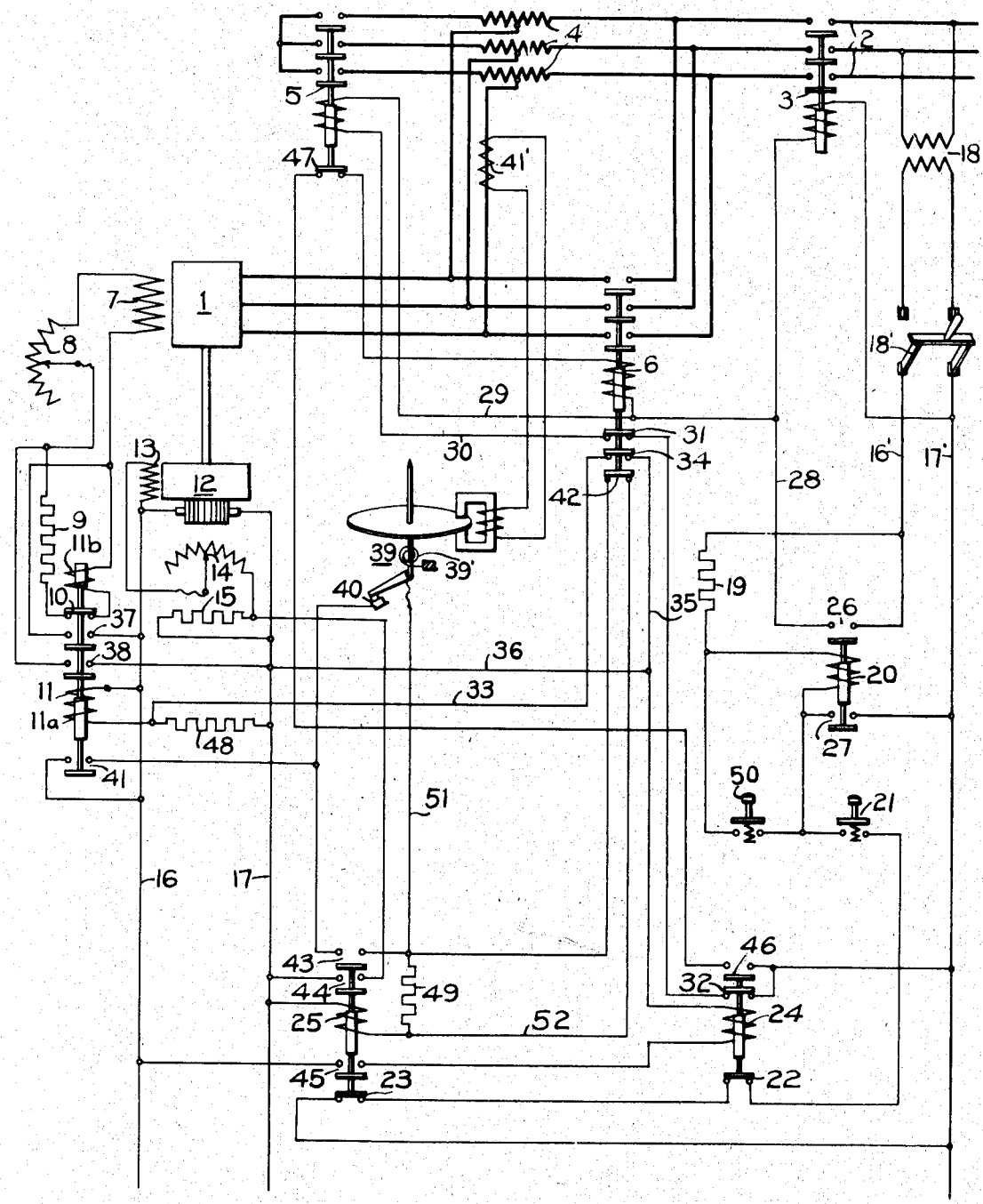
Figure 2:
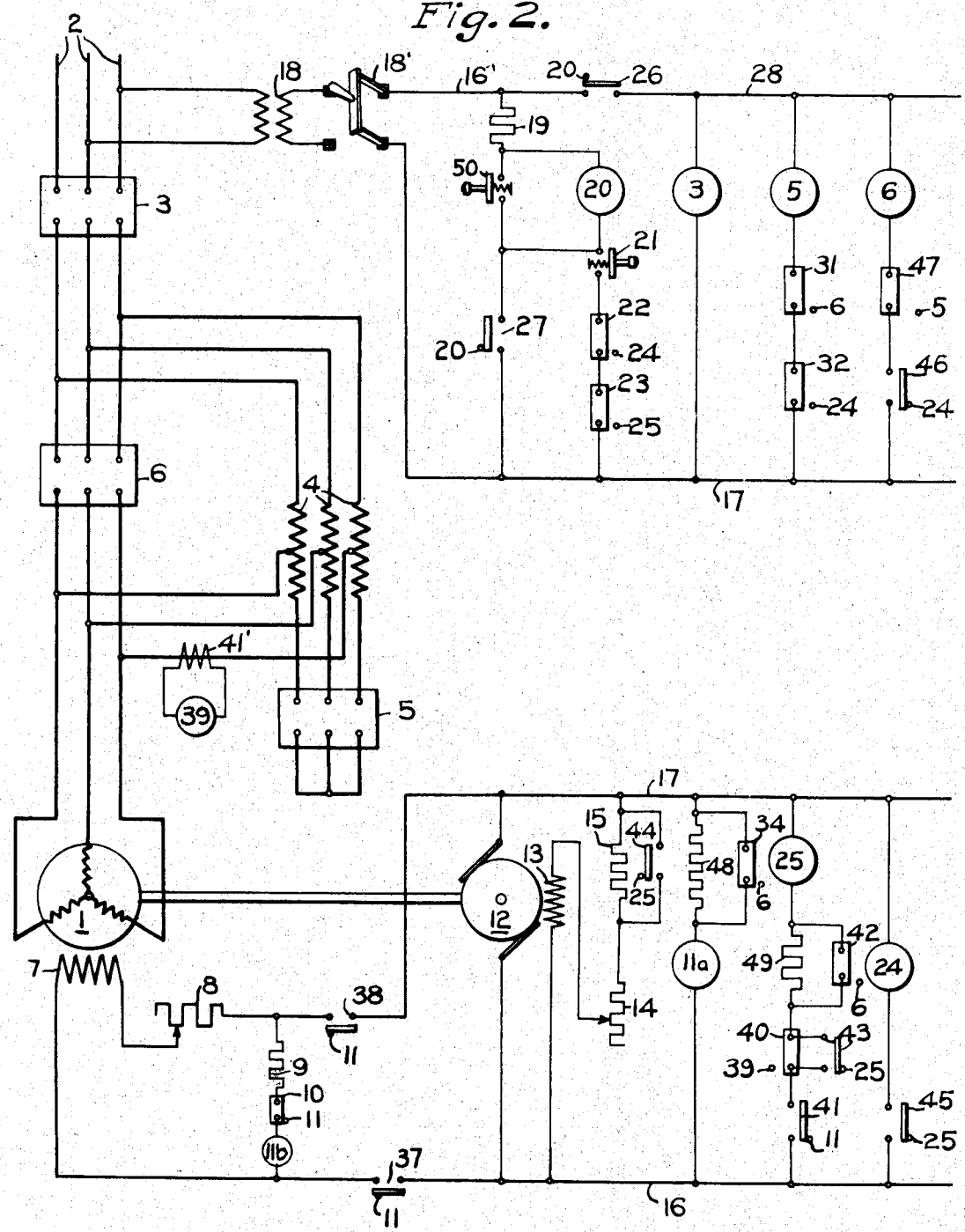

Figure 1 is a complete circuit diagram of the system which I employ to accomplish the objects above mentioned, and Fig. 2 is a schematic diagram of the circuits shown in full in Fig. 1.

In Figure 1, there is shown at 1 a motor, specifically a synchronous motor, which is supplied with electrical energy from a source of alternating current 2. The connection of the source 2 to the motor 1 is controlled by a circuit interrupter 3. Transformers 4 and a starting switch 5 are provided for starting the motor 1 on reduced voltage. A running switch 6 is also provided, to connect the motor 1 directly to the source 2 through the circuit interrupter 3.

The motor 1 is provided with a field winding 7, the circuit of which includes a field rheostat 8, a current limiting resistor 9, and the upper coil 11b of a relay 11, when the motor is stationary, and the entire system deenergized. The field circuit under these conditions is closed by the switch 10, which is controlled by the relay 11. The function of the coil 11b is to maintain the contacts of the relay 11 in the lower position as long as the current induced in the motor field during starting is above a predetermined value.

Directly connected to the shaft of the motor 1 is a direct-current generator 12 having a shunt field winding 13, the circuit of which includes the field rheostat 14 and the current-limiting resistor 15, the field circuit being connected across the direct-current control busses 16 and 17, connected to the exciter armature.

Energy for the operation of the alternating-current control devices is taken from the source 2 by means of a transformer 18. When the switch 18 is closed, the transformer 18 energizes the alternating-current control busses 16' and 17'.

The operation of the motor 1 may be initiated by the closing of a switch 21 which I have indicated as a push-button switch. It is to be understood, however, that this switch may be closed by any automatic means found suitable if it is desired that the operation of the motor be started automatically, or by a supervisory control system if such is available.

The closing of the switch 21 completes a circuit from the alternating-current control bus 16' through a current-limiting resistor 19, through the operating coil of a relay 20, through switches 21, 22 and 23, back to the control bus 17'. The switches 22 and 23 are under the control of relays 24 and 25, respectively, and are closed when the said relays are deenergized.

Upon the completion of the circuit above outlined, the operating coil of the relay 20 is energized and the switches 26 and 27 are closed. The closing of the switch 27 completes a locking circuit for the relay 20, which is in parallel with the switches 21, 22 and 23.

The closing of the switch 26 energizes the auxiliary control bus 28 which supplies current to the operating coil of the circuit interrupter 3, one end of said coil being connected to the other control bus 17'. The energization of the bus 28 also completes a circuit including conductor 29, the operating coil of the starting switch 5, conductor 30 and switch 31, which is operated by running switch 6 and which is closed when the operating coil of said switch is deenergized, and a switch 32 actuated by relay 24, the switch being closed when the relay is deenergized, and the other control bus 17'.

Upon the completion of the circuits described, the circuit interrupter 3 is actuated to connect one end of the auto-transformers 4 with the alternating-current source 2 and the starting switch 5 is operated to close its contacts and connect the other ends of the starting transformer to a common point. The reduced voltage taps of the starting transformer 4 are connected directly to the leads of the motor 1 and when the circuit interrupter 3 and the starting switch 5 have been closed, reduced voltage is applied to the motor armature. The motor is then started and its speed increased until it is substantially equal to the synchronous speed corresponding to the frequency of the supply source. During the starting period, as previously mentioned, the field circuit of the motor is closed through a current-limiting resistor 9 and the switch 10.

As the motor speed increases, the induced field current decreases, deenergizing coil 11b, and the voltage generated by the generator 12 builds up to a value which, though below the normal generator voltage because of the resistor 15 in the generator field circuit, is sufficient to energize coil 11a to operate the relay 11. The coil 11a is connected across the control busses 16 and 17 in a circuit including the coil, conductor 33, switch 34, which is closed when the running switch 6 is open, conductor 35 and conductor 36. When the motor speed has increased sufficiently so that the exciter voltage will operate the relay 11, the switch 10 is opened to remove the shunt from across the motor field circuit. Simultaneously, the switches 37, 38 and 41 are closed. The switches 37 and 38 connect the motor field circuit across the generator busses 16 and 17. When the field circuit is thus completed, a limited current is supplied from the exciter busses to the motor field.

A relay 39, which I have illustrated as of the induction type, operates in accordance with the starting current of the motor by means of current transformer 41' which supplies the relay winding, and which is connected in one of the motor starting leads. The relay 39 is provided with contacts 40 which are engaged when the relay is deenergized because of the action of spring 39'. During the starting period, the current in the transformer 41' is sufficient to energize the relay 39 so that the contacts 40 are disengaged. When the motor reaches substantially synchronous speed, however, the starting current decreases to a minimum and the relay 39 is deenergized to close contacts 40. The closing of these contacts completes a circuit from the exciter bus 16 through the switch 41 which is closed when the relay 11 is energized, through contacts 40 and a conductor 51, the switch 42, which is closed when the running switch 6 is deenergized, conductor 52, the operating coil of relay 25, to exciter bus 17.

When this circuit is established, the relay 25 is operated to close the switches 43, 44 and 45 and to open the switch 23. The closing of the switch 43 completes a locking circuit for the relay, in parallel with the contacts 40 of the relay 39. The closing of the switch 45 completes a circuit from the exciter bus 16 through the switch 45, the operating coil of relay 24, conductor 36 to exciter bus 17, but the voltage generated by the exciter which is operating with the resistor 15 and its field circuit, is insufficient to cause the operation of the relay 24.

The closing of the switch 44, however, upon energization of the operating coil of relay 25, short-circuits the resistor 15 in the circuit of the field of the exciter 12. This results in an increased exciter field current which causes the exciter voltage to be slowly increased to such a value that the relay 24 is operated.

The operation of the relay 24 closes the switch 46 and opens the switches 32 and 22. The opening of the switch 32 interrupts the circuit including bus 17' switch 32, switch 31, conductor 30, operating coil of starting switch 5, conductor 29, auxiliary control bus 28, switch 26 and bus 16'. The interruption of this circuit deenergizes the operating coil of the starting switch 5 which opens its main contacts and closes the switch 47. The switch 46 having been closed by the operation of the relay 24, the closing of the switch 47 completes a circuit from the bus 17' through the switch 46, through the switch 47, the operating coil of running switch 6, to the auxiliary control bus 28. This circuit causes the energization of the operating coil of the running switch 6, which upon closing, opens the switches 31, 34 and 42 and closes its main contacts to connect the motor 1 directly across the full voltage of the alternating current source 2.

The opening of the switch 31 again interrupts the circuit to the operating coil of the starting switch 5 to prevent the possibility of its being closed while the running switch 6 is closed. The opening of the switch 34 removes the short-circuit from around the resistor 48 in series with which the operating coil of the relay 11 remains across the exciter busses. Similarly, the opening of the switch 42 removes a short-circuit across the resistor 49 and the operating coil of relay 25 remains connected across the exciter busses through the resistor 49. The resistors 48 and 49 are of such a value that the current through the operating coils 11 and 25 and the resistors 48 and 49 in series therewith, respectively, is sufficient to maintain the relays in the energized position.

When it is desired to stop the operation of the motor 1, this may be accomplished by the closing of the switch 50 which, although shown as a push-button switch, may also be operated automatically or by supervisory control, which short-circuits the operating coil of the relay 20. The closing of the switch 50 deenergizes the coil of relay 20 which then opens its contacts 26 and 27, deenergizing the auxiliary control bus 28. This results in the opening of a circuit interrupter 3 and the stopping of the motor 1. As the motor speed decreases, the exciter voltage decreases and finally reaches a value at which the relays 11 and 25 are deenergized. The deenergization of the relay 11 closes the motor field circuit through the resistor 9 and the deenergization of the relay 25 closes the switch 23 in the starting circuit. It is obvious that all of the control devices have now returned to their original positions and the system is again ready for the starting cycle to be repeated.

One of the advantages obtained by my starting system is that by starting the motor with its field circuit closed through a resistor, a good starting torque is obtained.

A further advantage of my invention resides in the fact that the relay 24 which responds to the exciter voltage may be calibrated to pick up at the best transfer point, that is, at the point at which the transfer from the starting to running connections will cause a minimum disturbance in the supply circuit.

Figure 2 illustrates schematically the same circuits shown completely in Figure 1. The usual conventions are employed to indicate the operating coils of the various relays, the switches closed and opened thereby, and other features of the complete circuit. Figure 2 is included to simplify the tracing of the various control circuits shown in Figure 1. The operation of the system as shown in Figure 2, being the same as that described in connection with Figure 1, it is not repeated.

The operation of the system described herein thus consists in supplying a reduced starting voltage to the motor to accelerate it to substantially synchronous speed after which the exciter voltage slowly increases to a predetermined value which is limited by the resistance in the generator field circuit. When that voltage is attained, the field transfer relay 11 and the exciter field resistor-shunting relay 25 operate. The motor field winding is then connected to the exciter, the voltage of which now increases to normal value due to the shunting of the resistor in the exciter field. At the proper voltage of the exciter for which the switch transfer relay 24 is calibrated, it will operate to transfer from starting to running conditions by opening starting switch 5 and closing running switch 6 to apply full operating voltage to the motor.

I claim as my invention:

1. In a starting system for a motor with a field winding, a low-voltage starting source and a full-voltage running source, means for shunting the motor field winding, means for connecting the motor armature to said low-voltage source, means for opening the shunt across the field winding and connecting the field winding to a source of current, means for increasing the voltage on the motor field as the motor comes up to speed, and means for transferring the armature to said full-voltage source in response to the increased voltage on the field winding.

2. A starting system for a synchronous motor with a field winding comprising a low-voltage starting source and a full-voltage running source, and an exciter for energizing the motor field, means for shunting the motor field and connecting the motor armature to said low-voltage source, means for connecting the exciter to the motor field and means for increasing the exciter voltage as the motor comes up to speed, and means for transferring the armature to said full-voltage source in response to the increased exciter voltage.

3. A starting system for a synchronous motor with a field winding, comprising a low-voltage starting source, a full-voltage running source, starting and running switches for connecting the motor armature to said starting and running sources respectively, an exciter for energizing the motor field winding, a field switch, which when open, shunts the motor field winding through a resistance and, when closed, connects the field winding to the exciter, means for closing the starting switch, means for closing the field switch as the motor reaches synchronous speed, means for increasing the exciter voltage in response to a decrease in the starting current, and means for opening the starting switch and closing the running switch in response to the increased exciter voltage.

4. The method of starting a motor having a direct-connected exciter, which consists in applying reduced voltage to the armature while the field winding is shunted through a resistor, opening the shunt and connecting the field winding to the exciter as the motor reaches synchronous speed, increasing the exciter voltage when the starting current is reduced to a predetermined value, and applying full operating voltage to the armature when the exciter voltage attains a predetermined value.

5. The method of starting a synchronous motor having a direct-connected exciter, which consists in applying a reduced voltage to the armature while the field winding is shunted through a resistor, opening the shunt and connecting the field winding to the exciter having a resistor in its field circuit, when the motor comes up to speed, shunting the resistor in the exciter field circuit to increase the exciter voltage when the motor starting current has decreased to a predetermined value, and transferring the motor armature to a source of normal operating voltage when the exciter voltage has increased to a predetermined value.

6. A starting system for a synchronous motor, comprising low-voltage starting and full-voltage running sources, starting and running contactors for connecting the motor armature thereto, an exciter having a resistor in its field circuit for energizing the motor field winding and a field contactor which, when open, shunts the motor field winding and, when closed, connects the motor field winding to the exciter, means for closing the starting contactor, means for closing the field contactor as the motor reaches substantially synchronous speed, a relay responsive to starting current for shunting the resistor in the exciter field circuit to increase the exciter voltage when the starting current has decreased to a predetermined value, and a relay responsive to exciter voltage for opening the starting contactor and closing the running contactor.

7. In a motor control system, in combination, a motor provided with a field winding, a source of power for the motor, a source of excitation voltage for the field winding of the motor, means for connecting the motor to the power source, means operable to connect the field winding to the excitation source when the motor reaches a predetermined speed, and means responsive to the current drawn by the motor from the power source and rendered effective by the operation of the field winding connecting means for increasing the voltage of the excitation source.

8. In a motor control system, in combination, a motor provided with field and armature windings, a source of power for the motor, an exciter for the motor, means for connecting the armature to the power source, means responsive to the speed of the motor for connecting the field winding to the exciter, and means including a time-element relay responsive to the armature current of the motor for increasing the voltage of the exciter.

9. In a motor control system, in combination, a motor provided with field and armature windings, a source of power for the motor, an exciter for the motor, means for connecting the armature to the power source, means jointly responsive to the voltage induced in the field winding and the exciter voltage for connecting the field winding to the exciter, and means operable in response to a predetermined reduction of the armature current for increasing the voltage of the exciter.

10. In a motor control system, in combination, a motor provided with field and armature windings, a source of power for the motor, an exciter for the motor, means for connecting the motor to the power source, means differentially responsive to the voltage induced in the field winding and the voltage of the exciter for connecting the field winding to the exciter, and means including a relay responsive to the armature current of the motor for increasing the voltage of the exciter after the field winding has been connected thereto.

11. In a motor control system, in combination, a synchronous motor provided with field and armature windings, a source of power for the motor, an exciter for supplying excitation current to the field winding, means for connecting the motor to the power source, means operable to connect the field winding to the exciter when the motor reaches a predetermined speed, a resistor for controlling the excitation of the exciter, and means responsive only to the armature current of the motor for controlling the resistor to effect an increase in the exciter voltage.

12. In a motor control system, in combination, a synchronous motor provided with field and armature windings, a source of power for the motor, an exciter for supplying excitation current to the field winding, means for connecting the motor to the power source, automatically-operable means for connecting the field winding to the exciter when the motor reaches a predetermined speed, a resistor for controlling the excitation of the exciter, a switch operable to shunt the resistor, and a relay responsive to a predetermined change in the armature current for controlling the operation of the resistor-shunting switch.

13. In a motor control system, in combination, a synchronous motor provided with field and armature windings, a source of power for a motor, an exciter for supplying excitation current to the field winding, relay means responsive to predetermined relative values of induced field current and exciter voltage operable to connect the field winding to the exciter, means operable to vary the excitation of the exciter, and means responsive to the armature current of the motor for controlling the operation of the excitation-varying means.

14. In a starting system for a synchronous motor provided with armature and field windings, a reduced-voltage power source and a full-voltage power source, a source of excitation current for the motor, means disposed to shunt the field winding and operative to connect the field winding to the excitation source, said means being responsive to predetermined relative values of induced field current and voltage of the excitation source, means operable to connect the motor to the reduced-voltage power source, means responsive to the armature current of the motor for increasing the voltage of the excitation source, and means responsive to the voltage of the excitation source for effecting a transfer of the armature connections from the reduced-voltage source to the full-voltage source.

15. In a starting system for a synchronous motor provided with armature and field windings, a reduced-voltage power source and a full-voltage power source, a source of excitation current for the motor, a field switch disposed to shunt the field winding of the motor when in one operating position and to connect the field winding to the excitation source when actuated to another position, said field switch being differentially responsive to the induced field current and the voltage of the excitation source, means operable to connect the motor to the reduced-voltage source to start the motor, a relay responsive to a predetermined decrease in the armature current, means jointly responsive to the operation of the field switch and the said relay for increasing the voltage of the excitation source, and a transfer relay rendered responsive to the voltage of the excitation source by the operation of said last-mentioned means for effecting a transfer of the motor connections from the reduced-voltage source to the full-voltage source.

MAURICE E. REAGAN.